United States Patent
Huang et al.

(10) Patent No.: US 9,535,553 B2
(45) Date of Patent: Jan. 3, 2017

(54) TRANSMITTING DEVICES AND TRANSMISSION METHODS

(71) Applicant: MediaTek Singapore Pte. Ltd., Singapore (SG)

(72) Inventors: Yanni Huang, Beijing (CN); Chia-Feng Yeh, Tainan (TW); Lin Xu, Tianjin (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/690,657

(22) Filed: Apr. 20, 2015

(65) Prior Publication Data

US 2015/0305076 A1 Oct. 22, 2015

(30) Foreign Application Priority Data

Apr. 21, 2014 (CN) .......................... 2014 1 0160768

(51) Int. Cl.
| | |
|---|---|
| *H04B 5/00* | (2006.01) |
| *G06F 3/044* | (2006.01) |
| *H04W 4/00* | (2009.01) |
| *H04M 1/725* | (2006.01) |
| *H04B 1/00* | (2006.01) |

(52) U.S. Cl.
CPC ............ *G06F 3/044* (2013.01); *H04M 1/7253* (2013.01); *H04W 4/008* (2013.01); *H04M 2250/22* (2013.01)

(58) Field of Classification Search
CPC ..... G06F 3/044; G06F 3/0488; G06K 19/0723
USPC .................................. 345/173, 174; 455/41.1
See application file for complete search history.

(56) References Cited

U.S. PATENT DOCUMENTS

2006/0208860 A1* 9/2006 Park ..................... G06K 7/0008
340/10.2

* cited by examiner

*Primary Examiner* — Lee Nguyen
(74) *Attorney, Agent, or Firm* — McClure, Qualey & Rodack, LLP

(57) ABSTRACT

Transmitting devices and transmission methods are provided. The transmitting device includes a touch panel, a touch link module, a processing module and a transceiver module. The touch link module establishes a touch link with a receiving device through the touch panel. The processing module determines an instruction according to the link duration of the transmitting device and the receiving device after the touch link has been established. The transceiver module transmits the instruction to the receiving device.

26 Claims, 9 Drawing Sheets

TRANSMITTING DEVICES AND TRANSMISSION METHODS

CROSS REFERENCE TO RELATED APPLICATIONS

This Application claims priority of China Patent Application No. 201410160768.5, filed on Apr. 21, 2014, the entirety of which is incorporated by reference herein.

BACKGROUND OF THE INVENTION

Field of the Invention

The invention generally relates to data transmission, and more particularly, to data transmission through touch link technology.

Description of the Related Art

Near Field Communication (NFC) is a contactless technology for identification and interconnection. Near Field Communication allows users to exchange the information, access contacts and services by using the near field magnetic communication (such as the near field magnetic communication of 13.56 MHz) between the mobile devices, consumer electronics, PCs, or smart electronic devices.

Due to the maturity of the market, a mobile phone with NFC can either support a mobile payment function or serve as a point of sale (POS) device. However, a proximity card reader or a like element must be added to the handheld device due to the NFC being operated by sending and receiving a signal, and that will make the size of the handheld device larger, and the layout and the elements of the handheld device might be limited.

A touch-and-connect (touch link or touch connection) technology for touch panel devices which use an existing panel and driver IC for communication was developed recently, and has been described in US 2011/0304583, US 2013/0147760, CN 102916729A. The touch panel device includes a touch sensor. At least part of the touch sensor includes at least part of the touch panel of the touch panel device. The touch panel can be a touch panel without a display function, such as a touch pad, or with a display function, such as a touch screen. The touch sensor includes driving electrodes and sensing electrodes set on the substrate of the touch panel for forming the capacitance structure. At least one of the driving electrodes and the sensing electrodes is used as a sending electrode, and at least one is used as a receiving electrode. Thus, the signal can be sent and received by the existing electrodes and driver IC of the touch panel device, thereby achieving touch transmission based on an electric field without additional proximity card readers or like elements, reducing the size and cost of the touch panel device.

FIG. 1 is a schematic diagram of the touch transmission between a first touch panel device and a second touch panel device in accordance with the related art. As shown in FIG. 1, there are near fields 103a and 103b between the first touch panel device 101 and the second touch panel device 102. It should be noted that the first touch panel device 101 and the second touch panel device 102 are enabled to send and receive the signal. The first touch panel device 101 sends the signal to the second touch panel device 102 through a communication medium which is an electric field pointed to the second touch panel device 102 (the near field 103a as shown in FIG. 1). The second touch panel device 102 sends the signal to the first touch panel device 101 through a communication medium which is an electric field pointed to the first touch panel device 101 (the near field 103b as shown in FIG. 1). The X channel and the Y channel shown in FIG. 1 are used as the sending electrodes and the receiving electrodes set on the substrate for forming the capacitance structure.

FIG. 2 is a logic chart for achieving the touch transmission system between the first touch panel device and the second touch panel device in accordance with the related art. The first touch panel device includes a signal sending system 201, and the second touch panel device includes a signal receiving system 202, also shown in FIG. 2. The signal sending system 201 includes a touch transmission request signal generation unit 211, a communication connection establishing unit 212 and a first communication unit 213. The touch transmission request signal generation unit 211 is used to generate a request signal for touch transmission to the second touch panel device 102 through the sending electrode. The communication connection establishing unit 212 establishes a communication connection with the second touch panel device 102 after the receiving electrodes receive a response signal from the second touch panel device 102. The first communication unit 213 sends the communication information or the data to the second touch panel device 102 through the sending electrodes after the communication connection is established.

The signal receiving system 202 includes a touch transmission request response unit 221, a communication connection establishing unit 222 and a second communication unit 223. The touch transmission request response unit 221 responds with an acknowledge signal to the first touch panel device 101 through the sending electrodes after the receiving electrodes receive a touch transmission request signal sent from the first touch panel device 101. The communication connection establishing unit 222 establishes the communication connection with the first touch panel device 101 after the touch transmission request response unit 221 responds with the acknowledge signal to the first touch panel device 101. The second communication unit 223 receives the communication information or the data sent from the first touch panel device 101 through the receiving electrodes after the communication connection is established.

FIG. 3 is a schematic illustrating the transmission and reception of the signal by the electrodes of the touch panel of the related art. As shown in FIG. 3, the touch sensor (not shown) includes the sending electrodes 311, 321 and the receiving electrodes 312, 322 disposed on the substrate of the touch panel (such as the first touch panel 301 or the second touch panel 302) for forming the capacitance structure. The sending electrodes 311, 321 are used to send the signal, and the receiving electrodes 312, 322 are used to receive the signal.

FIG. 4 is a flow chart of the touch connection method in accordance with the related art. First, in step S401, the touch transmission request signal generation unit 211 generates a touch connection request signal, and sends it to the second touch panel device 102 through the sending electrodes. Then the receiving electrodes receive the acknowledge signal from the second touch panel device 102 (step S402). After that, the communication connection establishing unit 212 establishes the communication connection with the second touch panel device 102 (step S403). Finally, the method goes to step S404, and the first communication unit 213 sends the communication information or the data to the second touch panel device 102 through the sending electrodes.

Traditionally, the transmitting device may transmit different instructions to the receiving device according to the user's operation. Therefore, how to improve the user experience with a more convenient and efficient method to transmit different instructions is worthy of discussion.

BRIEF SUMMARY OF THE INVENTION

A transmitting device, a transmission system, and transmission methods are provided to overcome the problems mentioned above.

In accordance with an aspect of the present invention, a transmitting device is provided. The transmitting device comprises a touch panel, a touch link module, a processing module and a transceiver module. The touch link module is to establish a touch link with a receiving device through the touch panel. The processing module is to determine an instruction according to a link duration of the transmitting device and the receiving device after the touch link has been established. The transceiver module is to transmit the instruction to the receiving device. In particular, the transmitting device comprises a timing module to count the link duration and transmit a counting result to the processing module after the touch link being established. In one aspect, the processing module transmits a request for the instruction to the receiving device through the transceiver module before transmitting the instruction to the receiving device, and the transmitting device determines whether to transmit the instruction to the receiving device according to a confirmed result of the receiving device.

In accordance with another aspect of the present invention, a transmission method is provided. The transmission method is applied to a transmitting device. The transmission method comprises the steps of establishing a touch link with a receiving device through a touch panel of the transmitting device; determining an instruction according to a link duration of the transmitting device and the receiving device after the touch link being established; and transmitting the instruction to the receiving device. In particular, the method further comprises the steps of counting the link duration and transmitting a counting result to the processing module after the touch link being established; and stopping counting the link duration when receiving a feedback signal.

In accordance with another aspect of the present invention, a transmission method is provided. The transmission method comprises the steps of establishing a touch link through touch panels of a first electrical device and a second electrical device; determining which of the first electrical device or second electrical device is a transmitting end and which is a receiving end using a determination mechanism after the touch link being established; determining an instruction according to a link duration of the touch link between the first electrical device and the second electrical device; and transmitting the instruction to the receiving end. In particular, the determination mechanism comprises a button setting, a sensing result, or an audio indication.

According to the transmission methods of the embodiments described above, convenience and the operational efficiency are improved when the user uses the touch link technology to transmit different instructions.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

Certain terms and figures are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Therefore, a first electrical device is coupled with a second electrical device means the first electrical device is electrically connected to the second electrical device directly, or electrically connected to the second electrical device through other devices or mediums indirectly.

Figure 5:
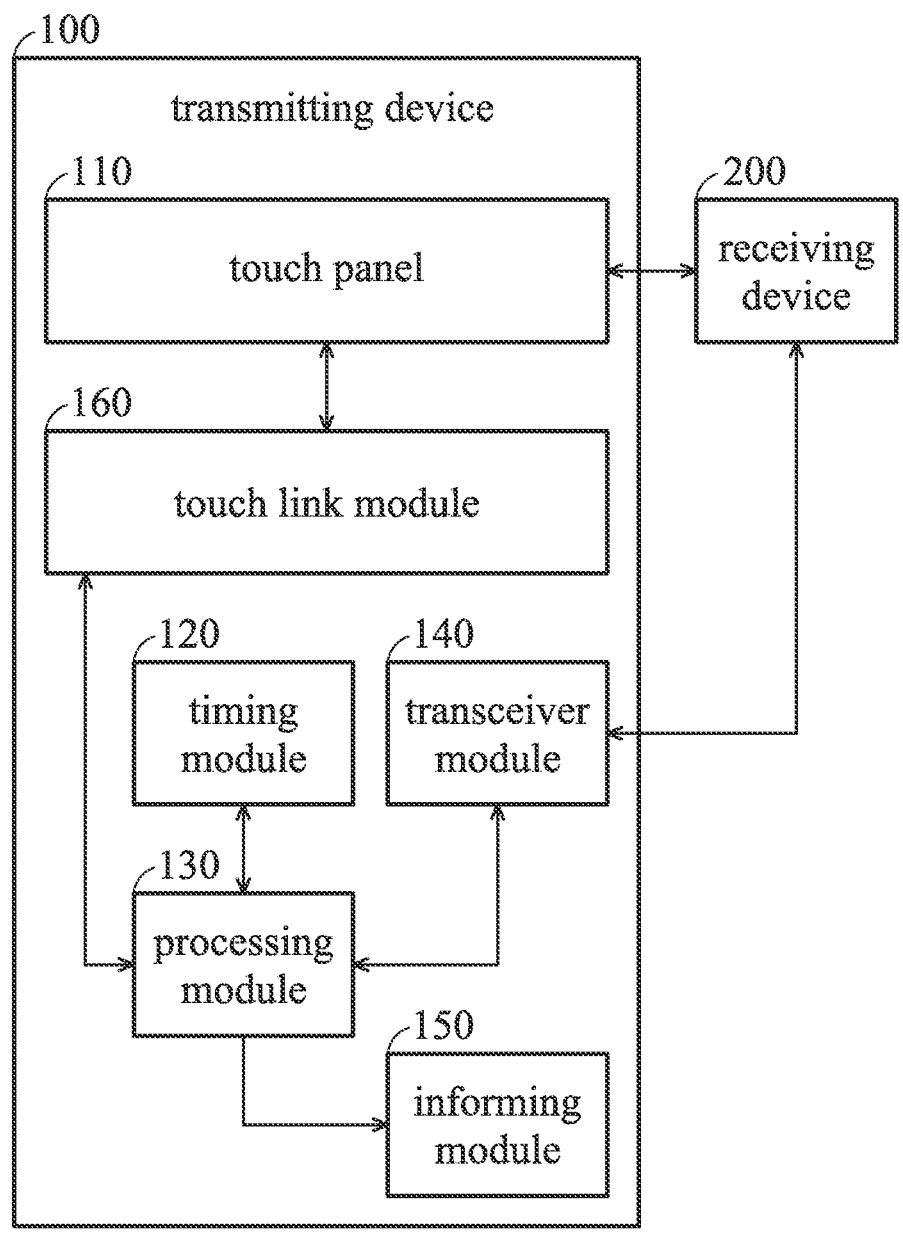
FIG. 5 is a block diagram of a transmitting device 100 according to an embodiment of the invention.

FIG. 5 is a block diagram of a transmitting device 100 according to an embodiment of the invention. The transmitting device 100 and receiving device 200 may be touch electronic device. The touch electronic device can be a mobile device such as a cell phone, a tablet PC, a note book, and a personal digital assistance (PDA), a desktop computer, a server or other electronic devices with touch modules (e.g. a touch IC). As shown in FIG. 5, in an embodiment of the invention, the transmitting device 100 comprises a touch panel 110, a timing module 120, a processing module 130, a transceiver module 140, an informing module 150 and a touch link module 160. Note that, in order to clarify the concept of the invention, FIG. 5 presents a simplified block diagram. However, the invention should not be limited to what is shown in FIG. 5. The transmitting device 100 can further comprise other modules or elements. The receiving device 200 may comprise a touch panel 210 and a touch-link module 260.

Figure 1:
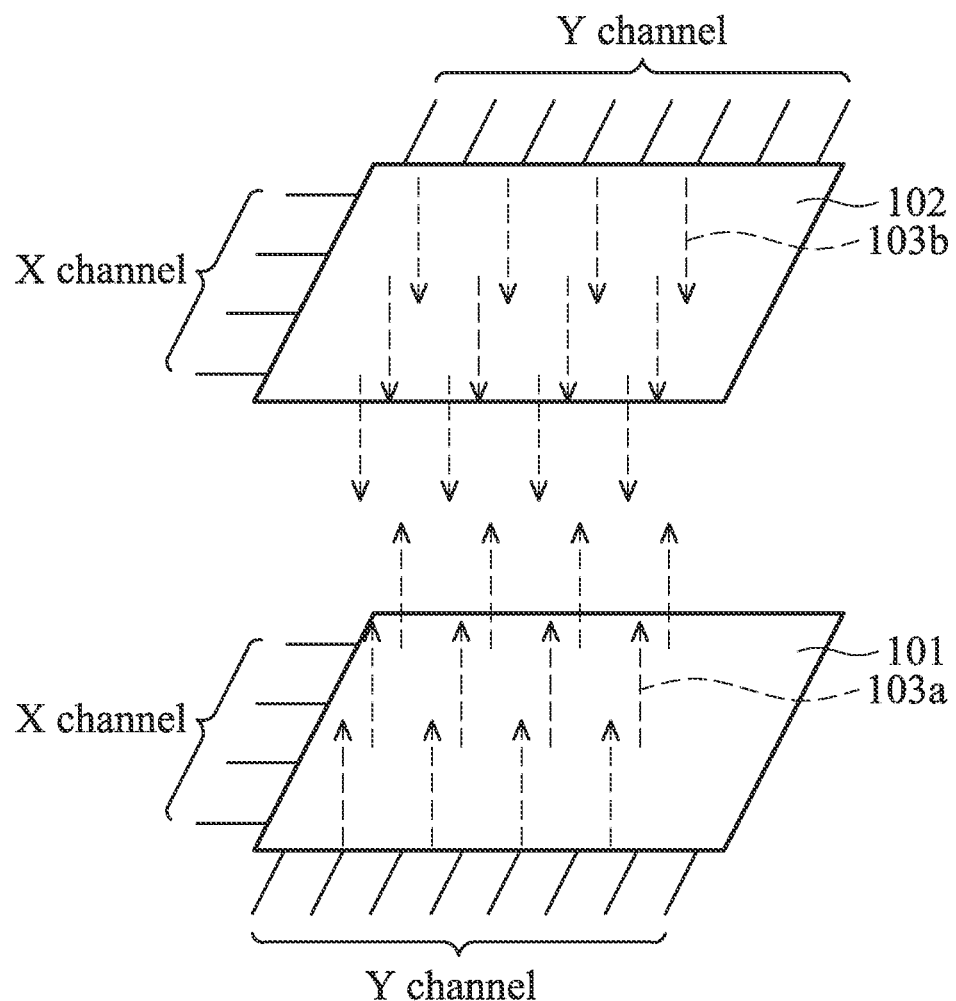
FIG. 1 is a schematic diagram of the touch transmission between a first touch panel device and a second touch panel device in accordance with the related art.
Figure 2:
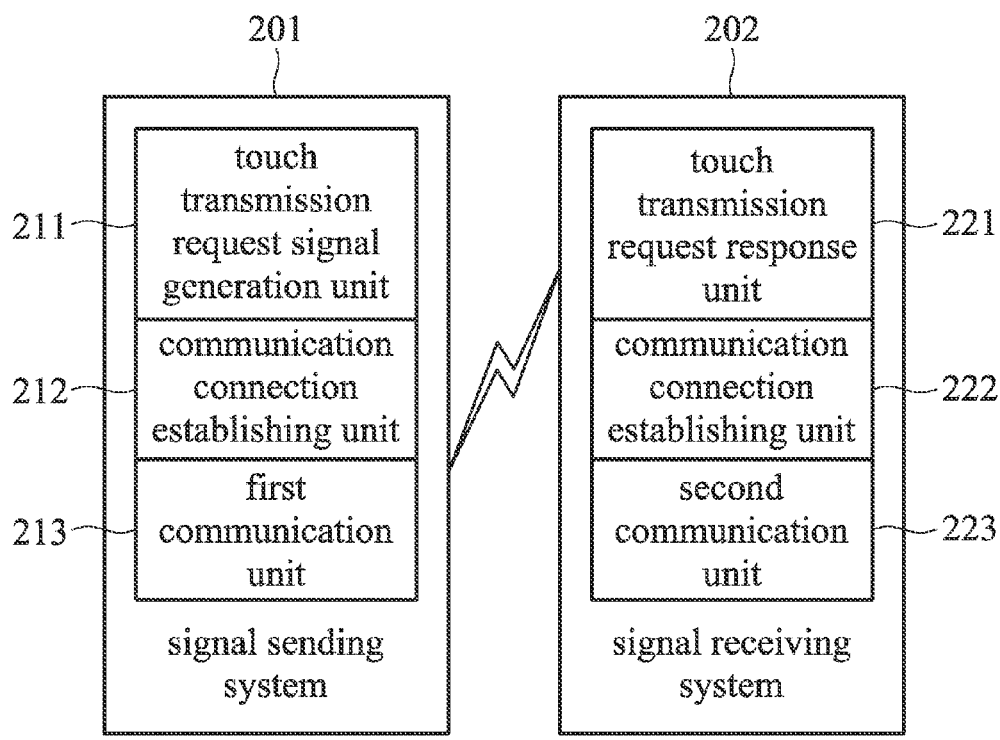
FIG. 2 is a logic chart for achieving the touch transmission system between the first touch panel device and the second touch panel device in accordance with the related art.
Figure 3:
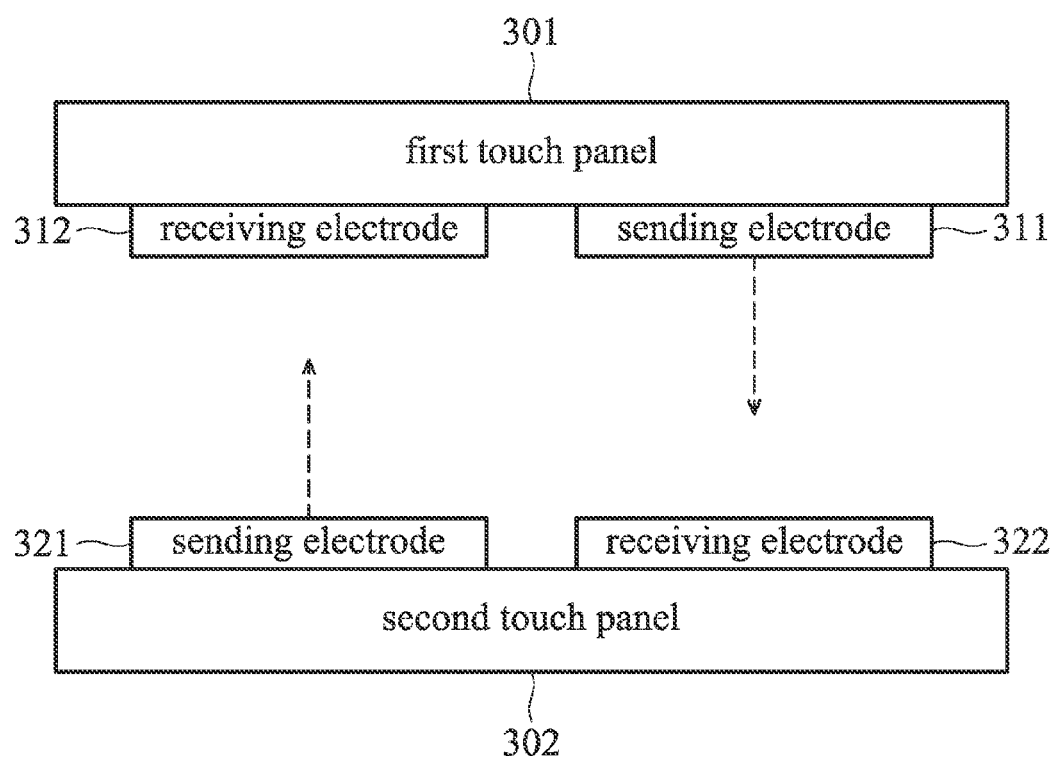
FIG. 3 is a schematic illustrating the transmission and reception of the signal by the electrodes of the touch panel of the related art.
Figure 4:
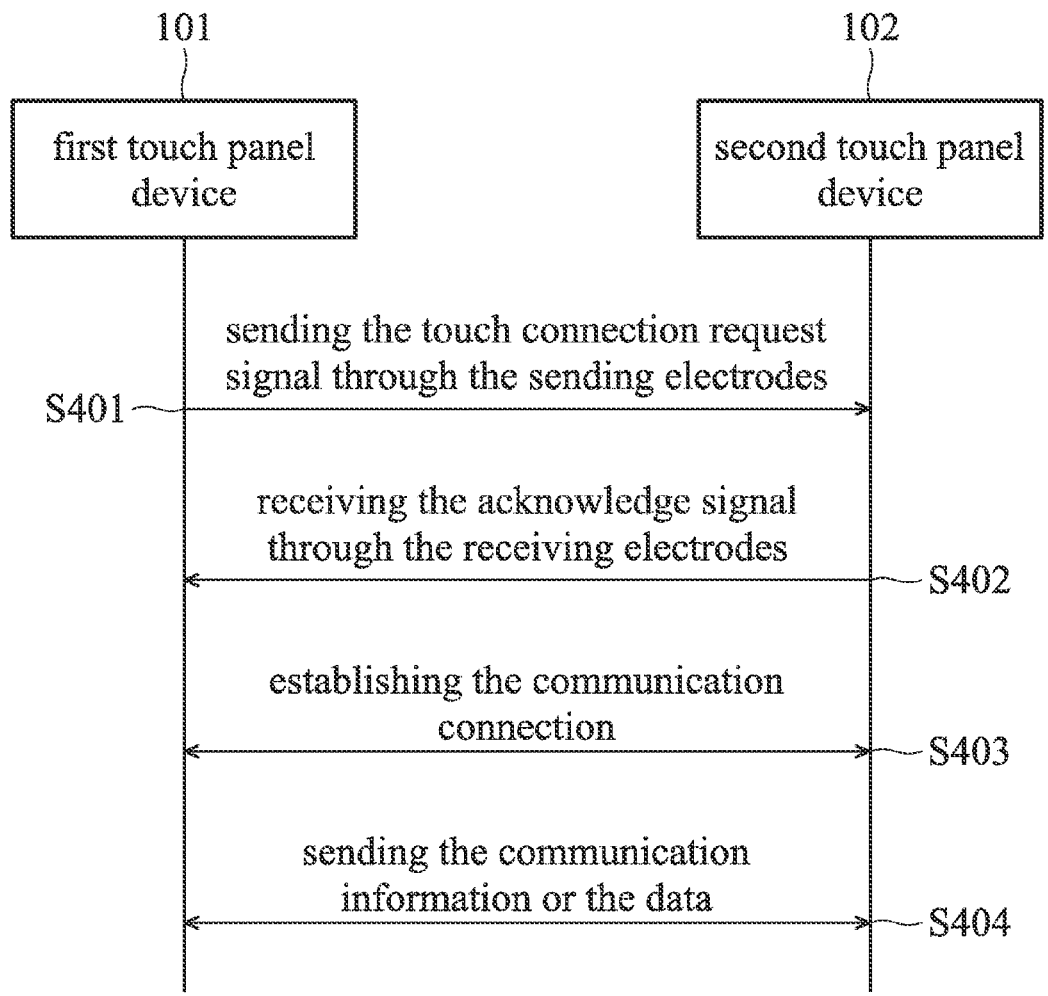
FIG. 4 is a flow chart of the touch connection method in accordance with the related art.

In an embodiment of the invention, the touch link module 160 comprises a sensing module 170 and a touch link module 180 (not shown in figures). Similarly, the touch link module 260 comprises a sensing module 270 and a touch link module 280 (not shown in figures). The structure and function of the sensing module 170 are similar to the sensing module 270 and the structure and function of the touch link module 180 are similar to the touch link module 280. The transmitting device 100 and/or the receiving device 200 detect whether it is in physical proximity to a device (e.g. approach or touch the device) by the sensing module 170 and/or the sensing module 270. For example, when the distance between the transmitting device 100 and the receiving device 200 is less than 5 mm, the sensing module 170 will determine the transmitting device 100 and the receiving device 200 are in physical proximity of each other. That is to say the sensing module 170 can detect whether the transmitting device 100 is in physical proximity to a device. When the sensing module 170 detects the transmitting device 100 is in physical proximity to a device, a first communication channel will be established by the touch link module 180. In an embodiment of the invention, the sensing module 170 detects the interacting electromagnetic field between the transmitting device 100 and the receiving device 200 (e.g. as shown in FIG. 3, detecting, by the sending electrodes and receiving electrodes of the touch panel, whether the interacting electromagnetic field is generated) and determines whether the transmitting device 100 is in physical proximity to the receiving device 200 according to the variations in the electromagnetic field. When the sensing module 170 detects that the transmitting device 100 is in physical proximity to the receiving device 200, the first communication channel will be established by the touch link module 180 and the touch link module 280. In an embodiment of the invention, the first communication unit 213 can establish the first communication channel with the second communication unit 223 through the touch link module 160 of the transmitting device 100 and the touch link module 260 of the receiving device 200.

In an embodiment of the invention, the timing module 120 comprises a timer which is configured to count the link duration of the touch link after the transmitting device 100 and the receiving device 200 established the touch link (i.e. established the first communication channel by the touch link technology). In an embodiment of the invention, the link duration of the touch link means the time duration of the touch link established by the transmitting device 100 and the receiving device 200. In another embodiment of the invention, the link duration of the touch link means the time duration when the transmitting device 100 is in physical proximity to the receiving device 200, wherein physical proximity means "approach" or "close to", for example, the distance between the transmitting device 100 and the receiving device 200 is about 5 mm. The processing module 130 is configured to determine the instructions according to the link duration of the touch link. Different link durations correspond to different instructions or instruction sets. For example, if the link duration is 1 second (a first link duration), the link duration corresponds to a transmission instruction; if the link duration is 3 seconds (a second link duration), the link duration corresponds to a display instruction; and if the link duration is 5 seconds (a third link duration), the link duration corresponds to the transmission instruction plus the display instruction. Note that, the example is only for clarifying the concept of the invention, but the invention should not be limited thereto. The user also can set and adjust the settings of the link durations and set different link durations to correspond to different instructions or instruction sets for different requirements.

In an embodiment of the invention, after the transmitting device 100 and receiving device 200 establish the touch link through the touch panel 110 according to the touch link technology, the processing module 130 indicates the first link duration corresponding to the first instruction to the timing module 120, and then the timing module 120 starts to count the link duration. When the first link duration has expired, the timing module 120 will transmit a message to the processing module 130 to inform the processing module 130 that the first link duration has expired. After receiving the message, the processing module 130 will indicate the second link duration corresponding to the second instruction to the timing module 120 and then the timing module 120 starts to count the second link duration from the end of the first link duration accordingly. In an embodiment of the invention, when a user decides to trigger some instruction, the user may pick up or move the transmitting device 100/receiving device 200, knock at the transmitting device 100, press a specific button on the transmitting device 100, control the transmitting device 100 by voice control, or carry on other actions to generate a feedback signal to the transmitting device 100. After receiving the feedback signal, the processing module 130 transmits an expired signal to the timing module 120 to inform the timing module 120 that the timing module 120 can stop counting the link duration. When the processing module 130 confirms the instruction triggered by the user, the processing module 130 will transmit the instruction to the receiving device 200 using the transceiver module 140. In an embodiment of the invention, the transceiver module 140 may be the signal sending system of the touch panel 110, i.e. the instruction can be transmitted according to the touch link technology. In another embodiment of the invention, a reserved response duration is provided to the user to determine whether to trigger the instruction, i.e. the processing module 130 not only indicates the link durations corresponding to the different instructions to the timing module 120, but also indicates the reserved response duration. When the reserved response duration has expired, the timing module 120 will transmit a message to the processing module 130 to inform the processing module 130 that the reserved response duration has expired. Then, the processing module 130 indicates the link duration corresponding to next instruction to the timing module 120.

When all link durations corresponding to different instructions have expired, and none of the instructions are triggered, the processing module 130 will indicate the first link duration corresponding to the first instruction to the timing module 120 again (i.e. a new cycle for the link durations will be performed accordingly). In an embodiment of the invention, if none of the instructions are triggered after the number of iterations of the pre-set cycles, the operation will be terminated. For example, if five instructions are pre-set and the number of iterations of the pre-set cycles is set to 3, when none of the instructions are triggered after the link durations corresponding to the five instructions, the processing module 130 performs the next cycle, and when none of the instructions are triggered after all pre-set cycles, the processing module 130 will terminate the operation.

In another embodiment of the invention, the processing module 130 may only indicate the maximum of the link durations to the timing module 120 rather than indicate all link durations corresponding to different instructions to the timing module 120. When the timing module 120 sets a threshold value as the maximum of the link durations and starts to count the link duration, the timing module 120 will transmit a signal to the processing module 130 to inform the processing module 130 that timing the link duration has started. In an embodiment of the invention, when the threshold value has expired, the timing module 120 will transmit a message to the processing module 130 to inform the processing module 130 that the threshold value has expired. Then the timing module 120 sets its timer to 0 and begins counting the link duration again after receiving the cycle signal from the processing module 130. After receiving the feedback signal, the processing module 130 transmits an expired signal to the timing module 120 to inform the timing module 120 that the timing module 120 can stop counting the link duration. The processing module 130 further transmits the inquiry signal to the timing module 120 and confirms the triggered instruction corresponding to the link duration according to the link duration which the timing module 120 responds to. The processing module 130 transmits the instruction to the receiving device 200 through the transceiver module 140 after the processing module 130 confirms the triggered instruction. In an embodiment of the invention, the transceiver module 140 may be the signal sending system of the touch panel 110, i.e. the instruction can be transmitted according to the touch link technology. In another embodiment of the invention, a reserved response duration is provided to the user to determine whether to trigger the instruction, i.e. the processing module 130 transmits the max link duration plus the reserved response duration to the timing module 120, and the timing module 120 sets a threshold value as the length of the max link duration plus the reserved response duration and starts to count the link duration.

In an embodiment of the invention, the corresponding relationship of the different instructions and link durations may be stored in a storage module (not shown in the figures) to assist the processing module 130 in confirming the instructions. In another embodiment of the invention, the storage module may also record the instructions that have been triggered between the transmitting device 100 and receiving device 200. When the touch link between the transmitting device 100 and receiving device 200 is established again, timing module 120 will count the link duration according to the record. In another embodiment of the invention, the timing module 120 counts the link duration corresponding to the instruction which is triggered most frequently according to the record.

In an embodiment of the invention, when the transmitting device 100 transmits the instruction to the receiving device 200, the processing module 130 may transmit the request for the instruction to the receiving device 200 through the transceiver module 140 first. Only after the receiving device 200 confirms the request for the instruction, the transmitting device 100 transmits the instruction to the receiving device 200. In another embodiment of the invention, when the receiving device 200 receives the request for the instruction transmitted from the transceiver module 140, the receiving device 200 will display a window to allow the user to determine whether to receive the request for the instruction, and generate a confirmed result according to the user's determination, and transmit the confirmed result to the transmitting device 100. Note that the window is only an example of the invention, and the invention should not be limited thereto. The receiving device 200 can also adopt audio, vibration, lights and other methods for the user to determine whether to receive the request for the instruction. When the confirmed result is that the receiving device 200 can receive the instruction, the transceiver module 140 will transmit the instruction to the receiving device 200. For example, if the triggered instruction is a calling instruction, the transceiver module 140 may transmit the request for the instruction for executing the calling instruction to the receiving device 200 first. Only when the confirmed result is that the receiving device 200 can execute the calling instruction will the transceiver module 140 transmit the calling instruction to the receiving device 200. If the triggered instruction is a download instruction, the transceiver module 140 may transmit the request for the instruction for executing the download instruction to the receiving device 200 first. Only when the confirmed result is that the receiving device 200 can execute the download instruction, the transceiver module 140 transmits the download instruction to the receiving device 200. That is to say the transmitting device 100 determines whether to transmit the instruction to the receiving device 200 according to the confirmed result.

In another embodiment of the invention, the transmitting device 100 can transmit the instruction to the receiving device 200 directly rather than transmitting the request for the instruction to confirm. The user can determine whether to transmit the request for the instruction to confirm according his requirements. In an embodiment of the invention, the transmitting device 100 can pre-set an emergency instruction. When the link duration with the receiving device 200 reaches the link duration of the emergency instruction, the transmitting device 100 can transmit the instruction to the receiving device 200 directly rather than transmitting the request for the instruction to the receiving device 200. For example, the transmitting device 100 may set an emergency instruction to call the police and the link duration of the emergency instruction is 10 seconds. When the link duration with the receiving device 200 reaches 10 seconds, and the emergency instruction is triggered, the transmitting device 100 will transmit the emergency instruction to the receiving device 200 directly rather than transmitting the request for the instruction to the receiving device 200.

In an embodiment of the invention, the processing module 130 can inform the user for an instruction corresponding to the current link duration through the informing module 150. The informing module 150 generates the informing signal corresponding to the instruction to inform the user to provide an instruction corresponding to the current link duration, wherein the informing module 150 generates the informing signal through audio, vibration, light or other methods. Note that, the example is only for clarifying the concept of the invention, but the invention should not be limited thereto.

In an embodiment of the invention, when the touch link between the transmitting device 100 and the receiving device 200 has been established according to the touch link technology, the transceiver module 140 may transmit an instructions list to the receiving device 200. In another embodiment of the invention, the transceiver module 140 may be the signal sending system of the touch panel 110, i.e. the instructions list can be transmitted according to the touch link technology. The instructions list shows the relationship of link durations and instructions. The receiving device 200 can know the instruction which the transmitting device 100 may transmit given different link durations according to its counting function and so that the receiving device 200 may prepare for the instructions in advance. Therefore, for some time-consuming instructions, the receiving device 200 may prepare for these instructions in advance to improve operational efficiency.

Figure 6:
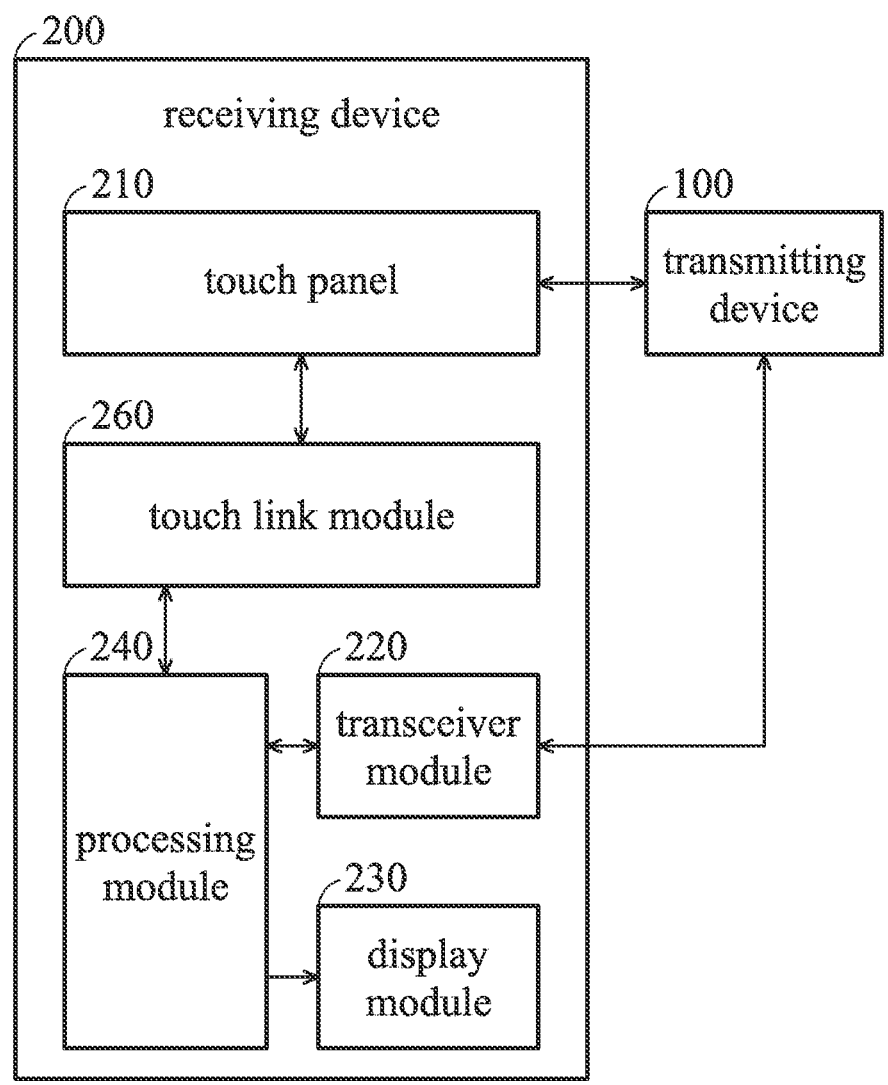
FIG. 6 is a block diagram of a receiving device 200 according to an embodiment of the invention.

FIG. 6 is a block diagram of a receiving device 200 according to an embodiment of the invention. In an embodiment of the invention, the receiving device 200 comprises a touch panel 210, a transceiver module 220, a display module 230, a processing module 240, and a touch-link module 260. Note that, in order to clarify the concept of the invention, FIG. 6 presents a simplified block diagram. However, the invention should not be limited to what is shown in FIG. 6. The receiving device 200 can further comprise other modules and elements.

In an embodiment of the invention, the receiving device 200 establishes the touch link with transmitting device 100 through the touch panel 210 according to the touch link technology. After the touch link is has been established, the transceiver module 220 may receive the instructions from the transmitting device 100. In an embodiment of the invention, before the transmitting device 100 transmits the instructions to the receiving device 200, the transceiver module 220 may receive the request for the instruction from the transmitting device 100 first. The receiving device 200 will transmit the request for the instruction to the processing module 240 after receiving the request for the instruction. The processing module 240 may command the display module 230 to display the request for the instruction on a window or interface to provide the user with an opportunity to determine whether to receive the request for the instruction, generate a confirmed result according to the user's determination, and then transmit the confirmed result to the transmitting device 100 through the transceiver module 220. Note that the receiving device 200 can also adopt audio, vibration, lights and other methods to inform the user to decide whether to receive the request for the instruction. Only when the confirmed result is that the user has decided to receive the request for the instruction will the transceiver module 220 receive the instruction from the transmitting device 100. In an embodiment of the invention, the transceiver module 220 may be the signal receiving system of the touch panel 210, i.e. the request for the instruction and/or the instructions can be received according to the touch link technology.

In an embodiment of the invention, when a touch link between two electronic devices has been established, the two electronic devices can determine which device is the transmitting end (e.g. transmitting device 100) and which device is the receiving end (e.g. receiving device 200) using a determination mechanism, such as a button setting (e.g. virtual buttons, physical buttons, or other user interfaces), sensing result (e.g. the direction and relative location of the devices), or audio indications. After the transmitting end and the receiving end are determined, the transmitting end may determine the instruction according to the link duration of the two devices, and then transmit the instruction to the receiving end.

Figure 7:
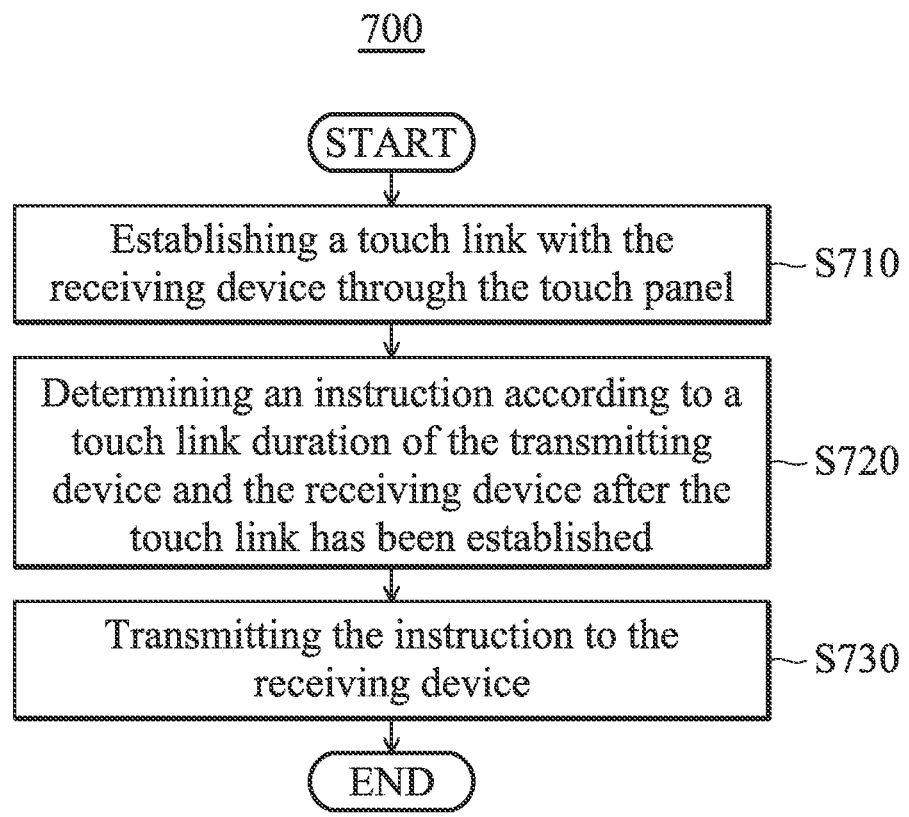
FIG. 7 is a flow chart 700 illustrating the transmission method according to an embodiment of the invention.

FIG. 7 is a flow chart 700 illustrating the transmission method according to an embodiment of the invention, wherein the transmission method is applied to the transmitting device 100. First, in step S710, the transmitting device 100 establishes a touch link with the receiving device 200 through its touch panel. In step S720, the transmitting device 100 determines an instruction according to a link duration of the transmitting device 100 and the receiving device 200 after the touch link has been established. In step S730, the transmitting device 100 transmits the instruction to the receiving device 200.

In an embodiment of the invention, step S720 further comprises that the transmitting device 100 may start to count the link duration of the touch link and generate a counting result after the touch link has been established. In another embodiment of the invention, step S720 further comprises that when the transmitting device 100 receives a feedback signal, the transmitting device 100 may stop counting the link duration. In an embodiment of the invention, a reserved response duration can be added between the different link durations.

In an embodiment of the invention, step S730 further comprises that the transmitting device 100 may transmit a request for the instruction to the receiving device 200, before transmitting the instruction to the receiving device 200. Only when the receiving device 200 determines to receive the instruction may the transmitting device 100 transmit the instruction to the receiving device 200.

In an embodiment of the invention, the flow chart 700 further comprises the step of generating the informing signal according to the instruction to inform the user for the instruction corresponding to the current link duration, wherein the informing signal can be generated through audio, vibration, light or other methods. In another embodiment of the invention, the flow chart 700 further comprises the step of storing each of the link durations corresponding to different instructions. In another embodiment of the invention, the flow chart 700 further comprises the step of transmitting the instruction list to the receiving device 200 after the touch link between the transmitting device 100 and the receiving device 200 has been established.

Figure 8:
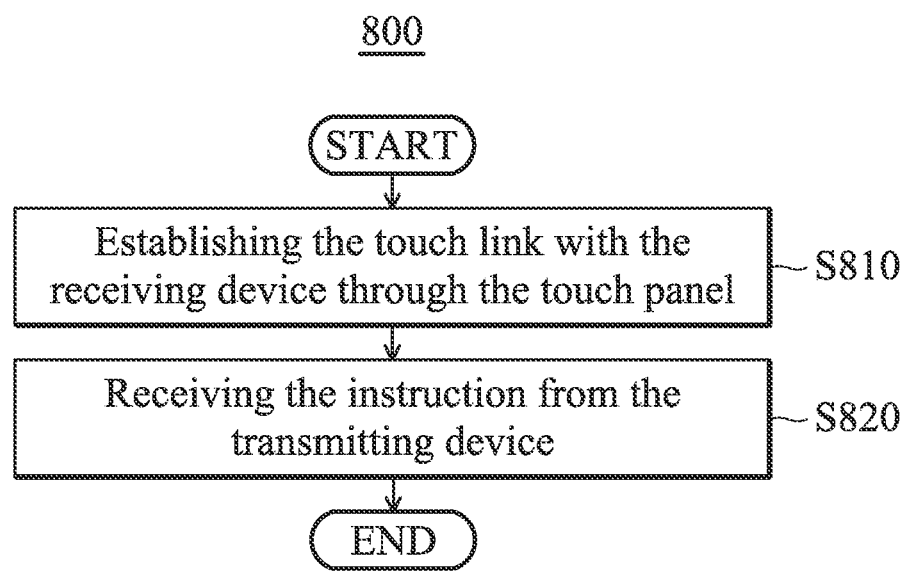
FIG. 8 is a flow chart 800 illustrating the transmission method according to another embodiment of the invention.

FIG. 8 is a flow chart 800 illustrating the transmission method according to another embodiment of the invention, wherein the transmission method is applied to the receiving device 200. In step S810, the receiving device 200 establishes the touch link with the transmitting device 100 through its touch panel. In step S820, the receiving device 200 receives the instruction from the transmitting device 100.

In an embodiment of the invention, step S820 further comprises that the receiving device 200 may receive the request for the instruction from the transmitting device 100 before receiving the instruction. The receiving device 200 may display the request for the instruction on a window or interface to allow the user to determine whether to receive the request for the instruction, after which the receiving device 200 may generate a confirmed result according to the user's determination. Note that the receiving device 200 can also adopt audio, vibration, lights and other methods to alert the user that he may make a determination as to whether or not to receive the request for the instruction. Only when the confirmed result is that the user has chosen to receive the request for the instruction will the receiving device 200 receive the instruction from the transmitting device 100.

Figure 9:
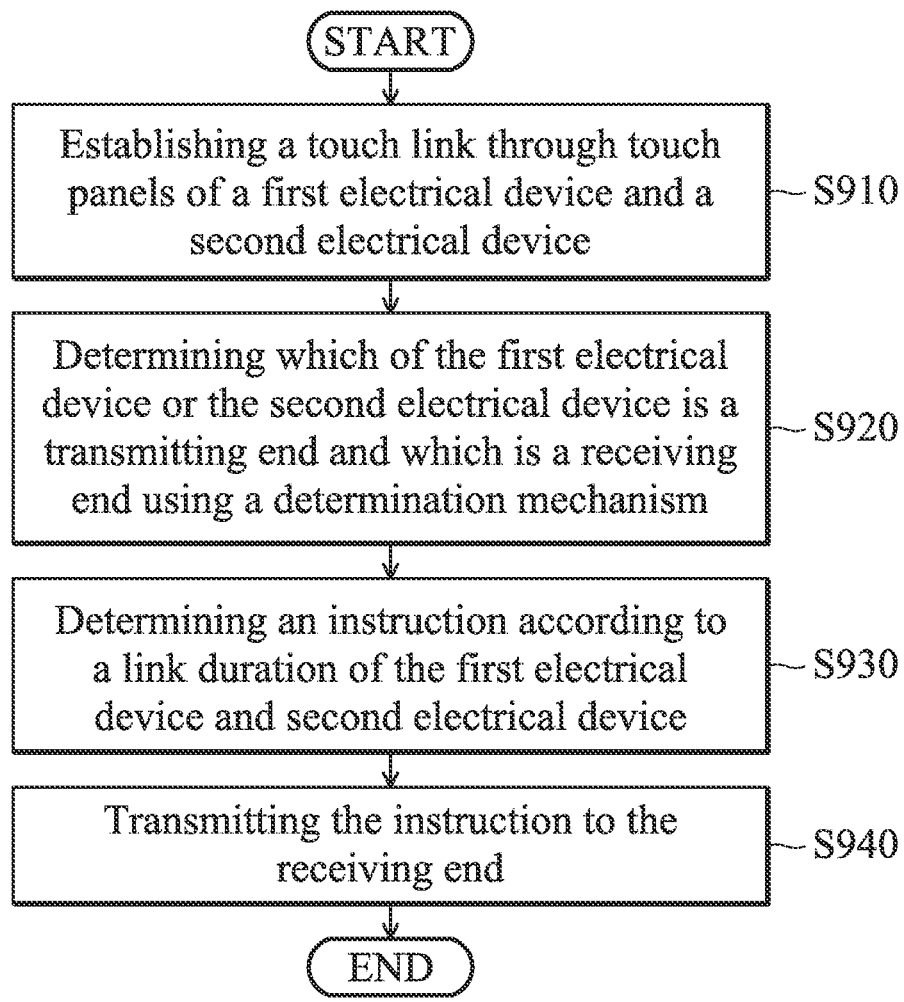
FIG. 9 is a flow chart 900 illustrating the transmission method according to another embodiment of the invention.

FIG. 9 is a flow chart 900 illustrating the transmission method according to another embodiment of the invention, wherein the transmission method is applied to the transmitting device 100 and the receiving device 200. First, in step S910, the first electrical device and second electrical device establish the touch link through their touch panels. In step S920, the first electrical device and second electrical device determine which device is transmitting end and which device is receiving end by a determination mechanism, after the touch link has been established, wherein the transmitting end can be the transmitting device 100 and the receiving end can be the receiving device 200. In step S930, the transmitting end determines the instruction according to the link duration of the first electrical device and second electrical device. In step S940, the transmitting end transmits the instruction to the receiving end. In an embodiment of the invention, the determination mechanism comprises the button setting, sensing result, audio indications or other methods.

According to the transmission methods of above embodiments, the different instructions can be triggered according to different link duration of devices, and therefore, it promotes convenience and operational efficiency when the user uses touch link technology to transmit different instructions.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A transmitting device, comprising:
    a touch panel;
    a touch link module for establishing a touch link with a receiving device through the touch panel;
    a processing module for determining an instruction according to a link duration of the transmitting device and the receiving device after the touch link being established; and
    a transceiver module for transmitting the instruction to the receiving device.

2. The transmitting device of claim 1, wherein the link duration is a time duration of a communication channel established by the transmitting device and the receiving device.

3. The transmitting device of claim 1, wherein the link duration is a time duration when the transmitting device is in physical proximity to the receiving device.

4. The transmitting device of claim 1, further comprising:
    a timing module for counting the link duration and transmitting a counting result to the processing module after the touch link being established.

5. The transmitting device of claim 4, wherein the processing module indicates a first link duration corresponding to a first instruction to the timing module, and when the first link duration has expired, indicates a second link duration corresponding to a second instruction to the timing module.

6. The transmitting device of claim 4, wherein the processing module indicates a first link duration corresponding to a first instruction and a reserved response duration to the timing module, and when the first link duration has expired, indicates a second link duration corresponding to a second instruction and the reserved response duration to the timing module.

7. The transmitting device of claim 4, wherein the processing module indicates a maximum of the link durations corresponding to each of the instructions to the timing module; or the processing module indicates a maximum of the link durations corresponding to each of the instructions and a reserved response duration to the timing module.

8. The transmitting device of claim 4, wherein when the processing module receives a feedback signal, the processing module transmits an expired signal to the timing module to stop counting the link duration.

9. The transmitting device of claim 8, wherein the feedback signal is generated by picking up or moving the transmitting device and the receiving device, knocking at the transmitting device, pressing a specific button on the transmitting device, or controlling the transmitting device by voice control.

10. The transmitting device of claim 4, wherein the counting result is a message that the link duration has expired, a message that the reserved response duration has expired, or the link duration.

11. The transmitting device of claim 1, wherein the processing module transmits a request for the instruction to the receiving device through the transceiver module before transmitting the instruction to the receiving device, and the transmitting device determines whether to transmit the instruction to the receiving device according to a confirmed result of the receiving device.

12. The transmitting device of claim 1, further comprising:
    an informing module for generating an informing signal corresponding to the instruction to inform the user for the instruction corresponding to a current link duration.

13. The transmitting device of claim 1, further comprising:
    a storage module for storing a corresponding relationship between the link durations and the instructions.

14. The transmitting device of claim 1, wherein the transceiver module transmits an instructions list to the receiving device after the touch link has been established.

15. A transmission method, applied to a transmitting device, comprising:
    establishing a touch link with a receiving device through a touch panel of the transmitting device;
    determining an instruction according to a link duration of the transmitting device and the receiving device after the touch link being established; and
    transmitting the instruction to the receiving device.

16. The transmission method of claim 15, wherein the link duration is a time duration of a communication channel established by the transmitting device and the receiving device.

17. The transmission method of claim 15, wherein the link duration is a time duration when the transmitting device is in physical proximity to the receiving device.

18. The transmission method of claim 15, further comprising:
    counting the link duration and transmitting a counting result to the processing module after the touch link has been established; and
    stopping counting the link duration when receiving a feedback signal.

19. The transmission method of claim 18, wherein the feedback signal is generated by picking up or moving the transmitting device and the receiving device, knocking at the transmitting device, pressing a specific button on the transmitting device, or controlling the transmitting device by voice control.

20. The transmission method of claim 18, wherein the counting result is a message that the link duration has expired, a message that the reserved duration has expired, or the link duration.

21. The transmission method of claim 15, further comprising:
   transmitting an request for the instruction to the receiving device before transmitting the instruction to the receiving device; and
   determining whether to transmit the instruction to the receiving device according to a confirmed result of the receiving device.

22. The transmission method of claim 15, further comprising:
   generating an informing signal corresponding to the instruction to inform the user for the instruction corresponding to a current link duration.

23. The transmission method of claim 15, further comprising:
   storing a corresponding relationship between the link durations and the instructions.

24. The transmission method of claim 15, further comprising:
   transmitting an instructions list to the receiving device after the touch link has been established.

25. A transmission method, comprising:
   establishing a touch link through touch panels of a first electrical device and a second electrical device;
   determining which of the first electrical device or the second electrical device is a transmitting end and which is a receiving end using a determination mechanism after the touch link being established;
   determining an instruction according to a link duration of the first electrical device and second electrical device; and
   transmitting the instruction to the receiving end.

26. The transmission method of claim 25, wherein the determination mechanism comprises a button setting, a sensing result, or an audio indication.

* * * * *